(12) United States Patent
Tu

(10) Patent No.: US 7,519,075 B2
(45) Date of Patent: Apr. 14, 2009

(54) METHOD AND SYSTEM FOR SERVERLESS VOIP SERVICE IN PERSONAL COMMUNICATION NETWORK

(75) Inventor: Guan-Hua Tu, Yongkang (TW)

(73) Assignee: Mediatek Inc., Hsin-Chu (TW)

( * ) Notice: Subject to any disclaimer, the term of this patent is extended or adjusted under 35 U.S.C. 154(b) by 590 days.

(21) Appl. No.: 11/009,766

(22) Filed: Dec. 10, 2004

(65) Prior Publication Data

US 2006/0126594 A1 Jun. 15, 2006

(51) Int. Cl.
*H04L 12/28* (2006.01)
*H04L 12/56* (2006.01)
*H04J 1/14* (2006.01)

(52) U.S. Cl. .................... 370/431; 370/392; 370/496

(58) Field of Classification Search ................ 370/389, 370/392, 431, 496
See application file for complete search history.

(56) References Cited

U.S. PATENT DOCUMENTS

| | | | | |
|---|---|---|---|---|
| 5,758,282 | A * | 5/1998 | Yamashina et al. | 455/428 |
| 6,847,632 | B1 * | 1/2005 | Lee et al. | 370/352 |
| 7,089,027 | B1 * | 8/2006 | Welch et al. | 455/521 |
| 7,130,582 | B2 * | 10/2006 | Barilovits | 455/41.2 |
| 7,262,791 | B2 * | 8/2007 | Kohno et al. | 348/153 |
| 2003/0041108 | A1 * | 2/2003 | Henrick et al. | 709/205 |
| 2003/0220793 | A1 | 11/2003 | Kosaka et al. | |
| 2004/0208186 | A1 * | 10/2004 | Eichen et al. | 370/401 |
| 2004/0235503 | A1 * | 11/2004 | Koponen et al. | 455/466 |
| 2005/0182653 | A1 * | 8/2005 | Urban et al. | 705/2 |
| 2005/0282518 | A1 * | 12/2005 | D'Evelyn et al. | 455/404.1 |
| 2005/0288045 | A1 * | 12/2005 | Yang et al. | 455/466 |

FOREIGN PATENT DOCUMENTS

| | | |
|---|---|---|
| CN | 1197567 | 10/1998 |
| CN | 1424831 | 6/2003 |
| JP | 2004109548 | 4/2004 |
| TW | 428390 | 4/2001 |
| TW | 576086 | 2/2004 |
| TW | I220511 | 8/2004 |
| TW | M252202 | 12/2004 |
| WO | 2004095850 | 11/2004 |

OTHER PUBLICATIONS

"Carrier Grade Voice over IP" Daniel Collins, Jun. 30, 2003 and its partial English translation of pp. 116-119, and figures 5-3 and 5-4.
English abstract of CN1424831.
English abstract of CN1197567.
English abstract of JP2004109548.
English abstract of TW428390.
English abstract of TW576086.
English abstract of TW220511.

* cited by examiner

*Primary Examiner*—Ronald Abelson
(74) *Attorney, Agent, or Firm*—Thomas, Kayden, Horstemeyer & Risley

(57) ABSTRACT

Method and system for supporting serverless VoIP service are provided. Network information of a first device and a second device is exchanged through a telecommunication network. A VoIP connection between the first and second devices can be established through an internet based network according to the exchanged network information. The network information may comprise an IP address and a port number, and can be delivered by short message service.

34 Claims, 5 Drawing Sheets

METHOD AND SYSTEM FOR SERVERLESS VOIP SERVICE IN PERSONAL COMMUNICATION NETWORK

BACKGROUND

The invention relates to Voice over Internet Protocol (VoIP), and more specifically, to VoIP services in personal communication networks.

Internet Voice, also known as VoIP, is a technology that allows users to make telephone calls using a broadband Internet connection instead of an analog phone line. VoIP defines a way to carry voice calls over an IP network including performing digitization and packetization of the voice streams. IP Telephony utilizes the VoIP standards to create a telephony system where higher level features, such as advanced call routing, voice mail, contact centers, etc., can be utilized.

Currently, there are some popular VoIP networks, including H.323, developed by the International Telecommunication Union (ITU), and Session Initiation Protocol (SIP), developed by the Internet Engineering Task Force (IETF). These VoIP networks provide peer-to-peer, multimedia signaling protocol through several servers. A SIP network for example comprises four types of servers: a registrar server for location registration; a proxy server for call establishment, call signal forwarding, and authentication; a redirect server for call signal forwarding; and a user-agent server.

FIG. 1 shows an example of a user (user A) with a mobile device 120 making a VoIP call to another user (user B) with a mobile device 160 via an Internet 14. In most VoIP networks, user A needs to register an account to registrar server 144 before accessing the VoIP network. User A in a Wireless Local Area Network (WLAN) 12 sends call signals through SIP proxy or redirect servers 142 and 146 via Access Points (AP) 122 and 162 to user B in WLAN 16. After several messages are exchanged through the VoIP servers 142, 144, and 146, a connection is established between user A and user B enabling. access to their network information, such as IP addresses and port numbers. User A and user B can then engage in a VoIP conversation by directly transmitting voice packets through Internet 14.

Some corporate entities establish their own SIP or H.323 networks on the Internet. These corporate entities are so called VoIP service providers. The VoIP service providers generally do not provide IP bearer services. The IP bearer services may be LAN or WLAN supported by Asymmetric Digital Subscriber Line (ADSL) or cable services providers. Customers can use LAN or WLAN, which is generally free to the public, to access s VoIP service provider VoIP network.

Maintenance of a VoIP network, however, is costly. Take a SIP network for example, the VoIP service providers must implement SIP services such as registrars, proxy servers, and redirect servers. As a result, using the conventional VoIP, consumers are forced to pay VoIP service fees to their service providers, even if the IP bearer service is free.

FIG. 2 shows typical VoIP call establishment procedures using SIP. Mobile 1 and Mobile 2 must register their accounts to a registrar by providing network information such as IP address and port number through SIP (Session Initiation Protocol) proxy 1 and SIP proxy 2 respectively. Mobile 1 must be authenticated by SIP proxy 1 before sending a SIP invite message to Mobile 2. Mobile 1 sends the SIP invite message to SIP proxy 1 with a calculated value for authentication, and SIP proxy 1 forwards the invitation to SIP proxy 2 if Mobile 1 is authenticated by SIP proxy 1. Mobile 2 replies with a SIP ringing message via the SIP proxy servers when receiving the SIP invite message. Mobile 2 sends SIP 200 OK to Mobile 1 when the user of Mobile 2 answers the call. Mobile 1 replies with a SIP acknowledgement when receiving SIP 200 OK from Mobile 2. As a result, a VoIP connection between Mobile 1 and Mobile 2 is established. The VoIP servers such as the registrar and two SIP proxy servers in FIG. 3, play an important role in establishing the VoIP connection since these servers handle call signal forwarding, user authentication, and registration.

For the above typical VoIP service, drawbacks comprise server instability, high VoIP servers maintenance cost, low compatibility, and complex procedures. Furthermore, VoIP service customers must apply for VoIP services and must pay VoIP service fees to service providers, which may be based on VoIP session duration. Customers that use different voice service providers may not be able to communicate with each other, and there may be interoperability issues as VoIP servers may be built by different vendors. Additionally, complicated registration and authentication procedures are required before a VoIP conversation can be established.

SUMMARY

Methods and systems of Voice over Internet Protocol (VoIP) in personal communication networks are provided. Some embodiments of a VoIP method comprise exchanging network information of a first device and a second device through a telecommunication network, and establishing a VoIP connection between a first and second devices through an Internet based network according to the exchanged network information. The telecommunication network may be the Global System for Mobile communication (GSM), General Packet Radio Service (GPRS), Enhanced Data rates for GSM Evolution (EDGE), Code Division Multiple Access (CDMA) or any 3G network. In some embodiments, the exchanged network information comprises an IP address and a port number, and the network information is exchanged via instant messages. The instant messages maybe delivered by Short Message Service (SMS), Multimedia Messaging Service (MMS), or Instant Messaging and Presence Services (IMPS). In some embodiments, the VoIP connection is established by sending and receiving Session Initiation Protocol (SIP) packets according to the exchanged network information.

Some embodiments of a VoIP communication system comprise a first mobile device, a second mobile device, and a message service center operating in a telecommunication network. The first and second mobile devices exchange network information by sending and receiving messages through the message service center, and establish a VoIP conversation through an Internet based network according to the exchanged network information. In some embodiments, the message service center is a Short Message Service Center (SMSC) which exchanges the network information using short message service (SMS) provided by the telecommunication network. The first and second mobile devices may connect to the Internet based network through a wireless local area network (WLAN) via Access Points (AP).

In some embodiments, network user information is exchanged via an Internet based network, for example, by using email or Internet based instant messages. A VoIP connection can be established according to the exchanged network information.

Some embodiments of a VoIP communication system comprise a first and a second mobile device, and a message service center receiving and forwarding messages via an Internet based network. In some embodiments, the message service center may be an email service center, and the two mobile devices exchange network information via email. The network information comprises an IP address and a port number. Network user information can thus be obtained without VoIP servers. A VOIP connection then be established according to the obtained network information.

DESCRIPTION OF THE DRAWINGS

Methods and systems of VoIP in personal communication networks can be more fully understood by reading the subsequent detailed description in conjunction with the examples and references made to the accompanying drawings, wherein.

DETAILED DESCRIPTION

The VoIP methods and systems of the present invention allow users to make VoIP calls without requiring a VoIP server. Customers may use instant messages, such as SMS, MMS, WAP Push, IMPS, or email to exchange network information. Once a user obtains the network information of a peer, direct communication can proceed according to the obtained network information.

Figure 1:
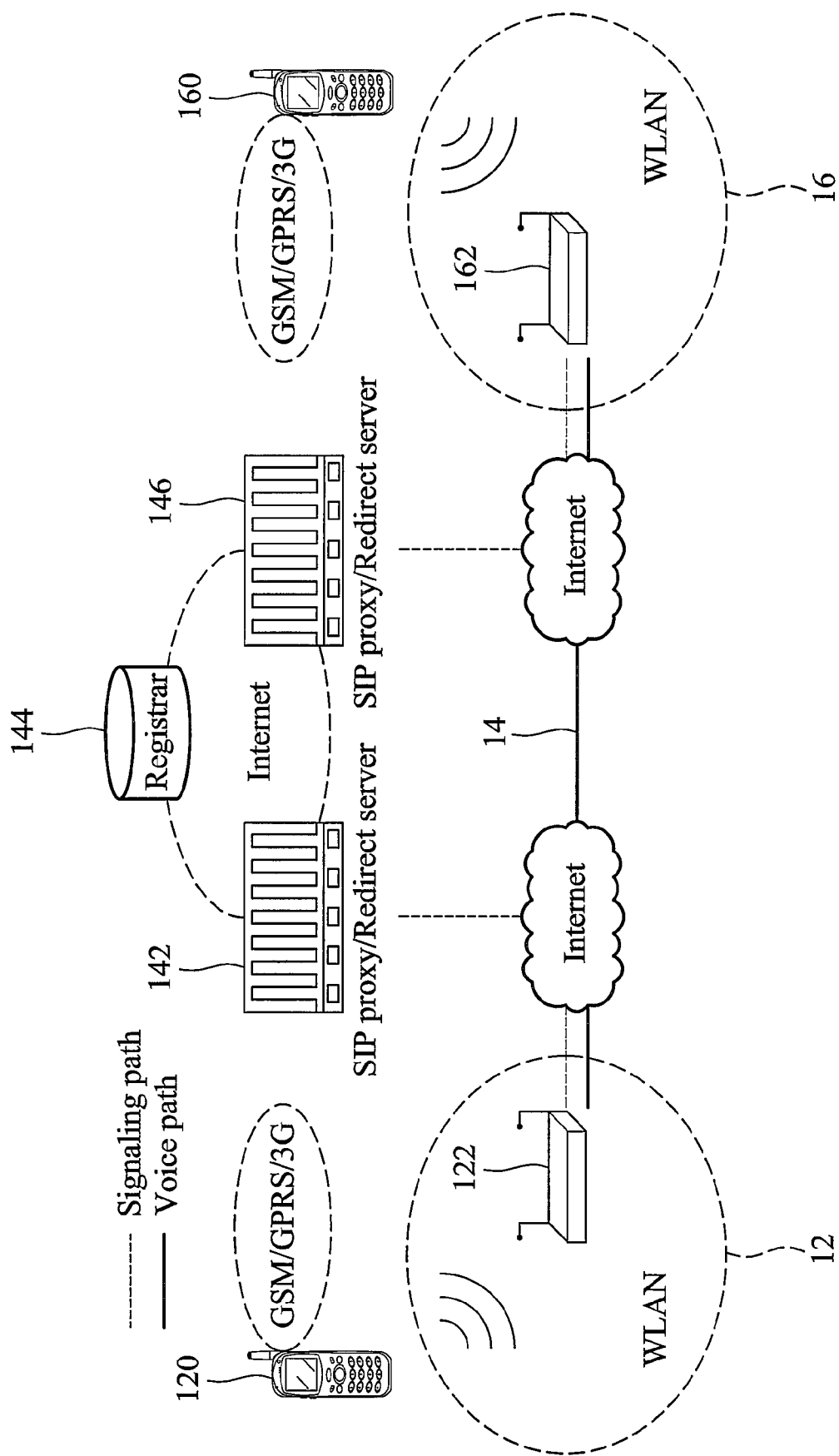
FIG. 1 illustrates a typical VoIP network established on the Internet.
Figure 2:
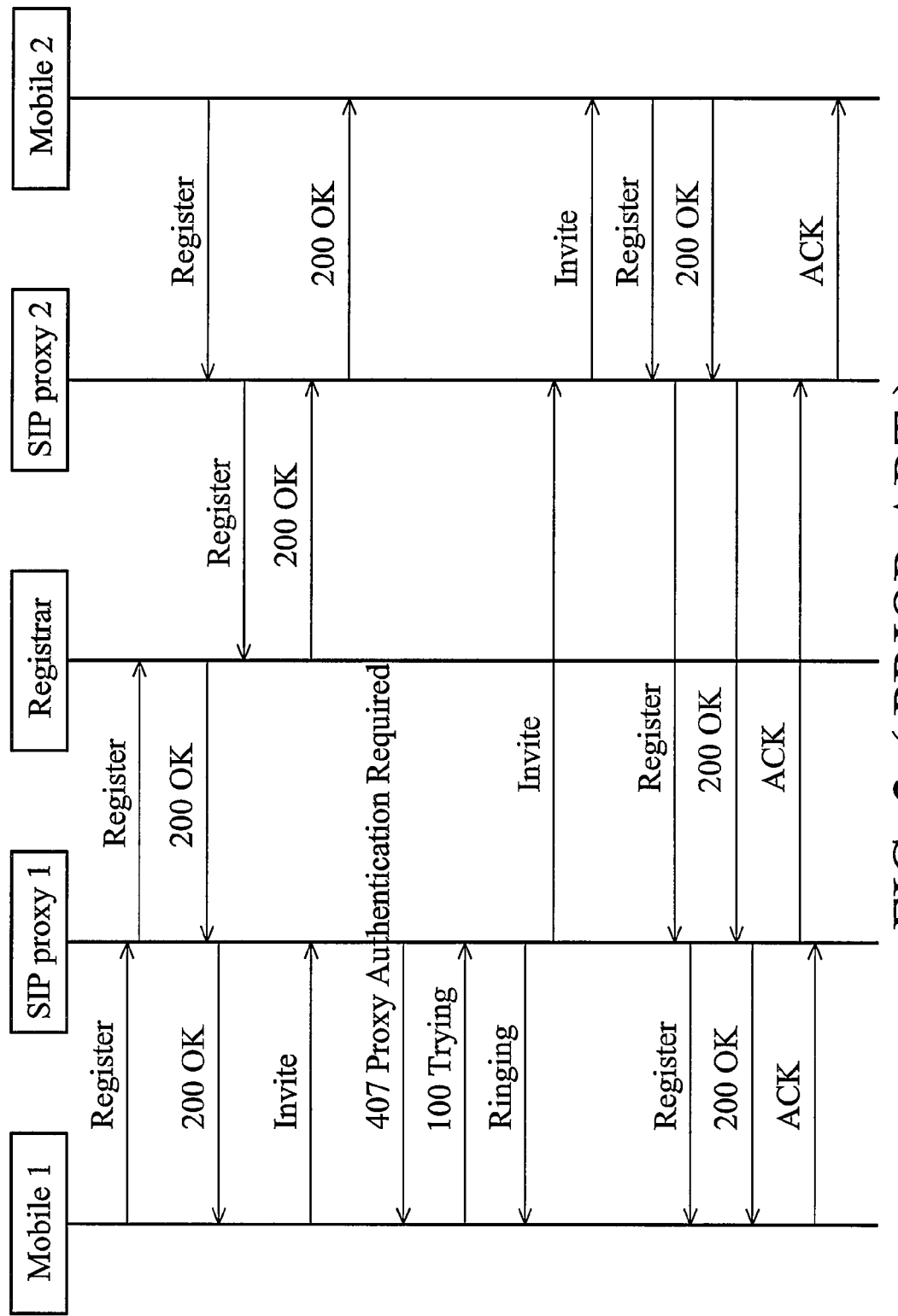
FIG. 2 illustrates typical procedures for VoIP call establishment by SIP.
Figure 3:
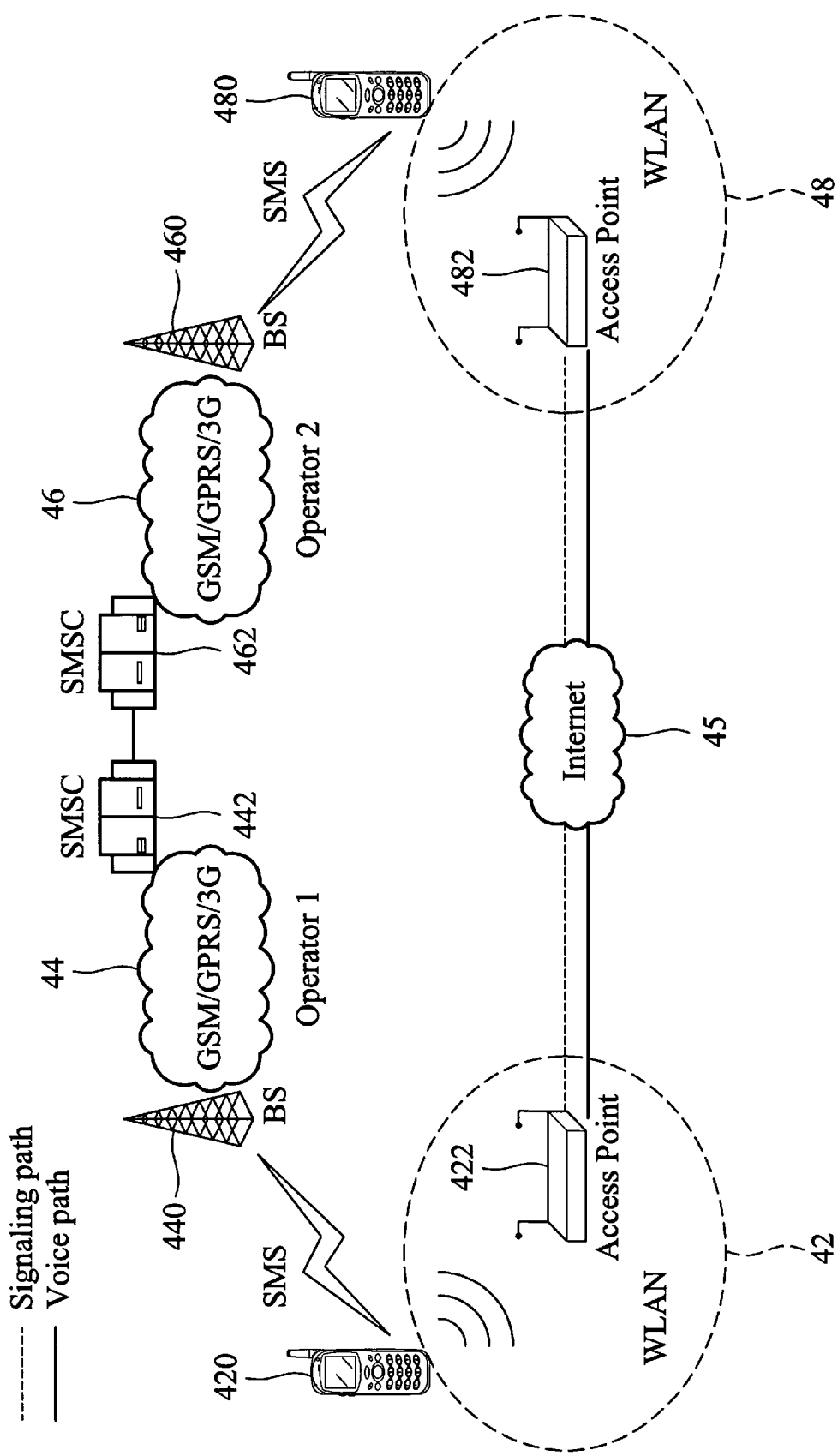
FIG. 3 illustrates an embodiment of a VoIP network established on the Internet.
Figure 4:
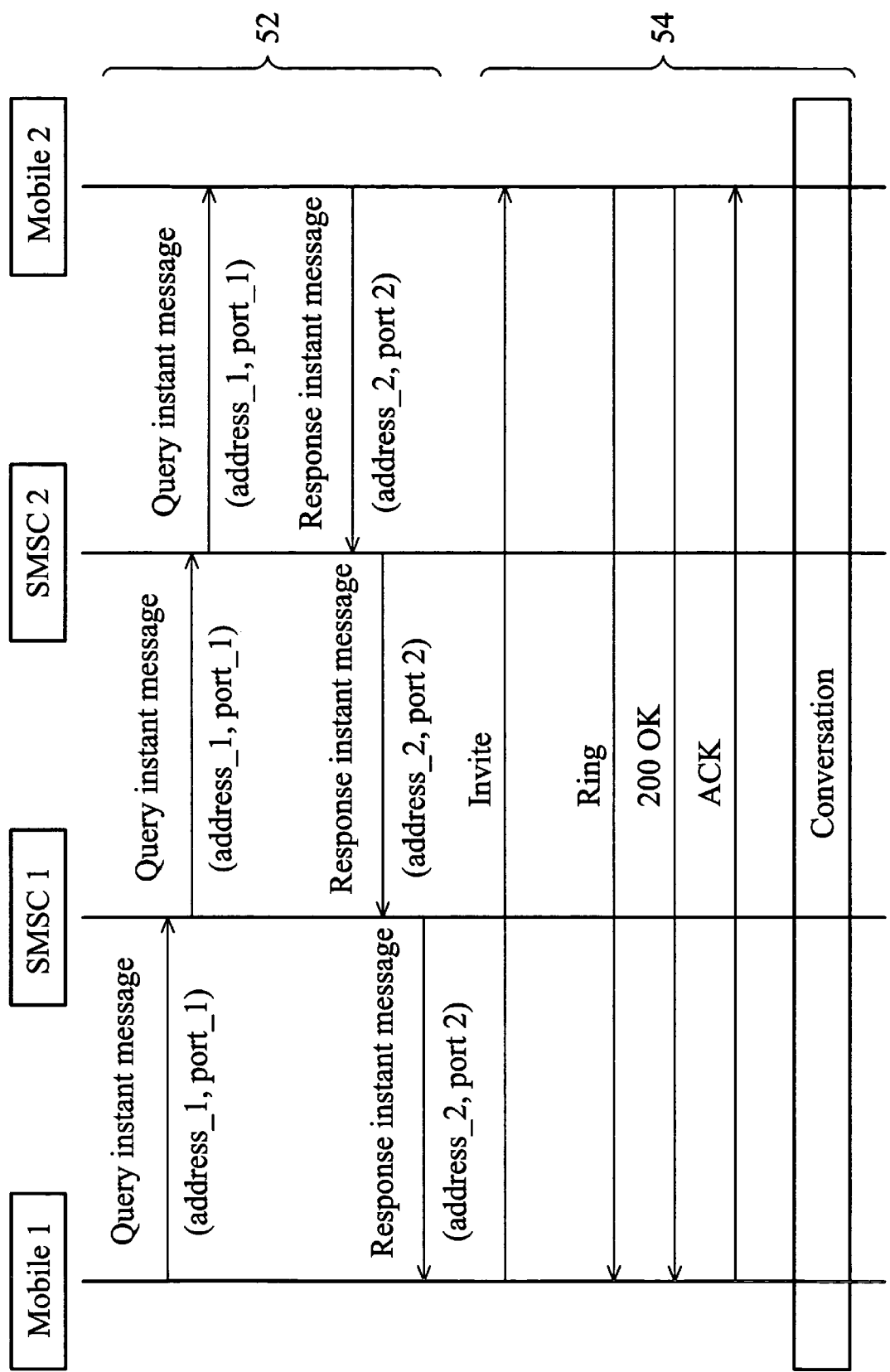
FIG. 4 illustrates an embodiment of VoIP call establishment procedures.

FIG. 4 shows an embodiment of a VoIP network established on an Internet. Mobile devices 420 and 480 are dual mode mobile phones that can access a telecommunication network 44, 46, and WLAN 42, 48. To establish a VOIP call, the mobile device 420 sends a SMS (Short Message Service) message to the mobile device 480 through the telecommunication network 44 and 46. The SMS message is sent to a Short Message Service Center (SMSC) 442 through a base station (BS) 440. The telecommunication network can be a third generation system or a GSM/GPRS communication system. This SMS message comprises the network information of the mobile device 420. The network information includes an IP address and a port number of the mobile device 420. Through the telecommunication network 44 and 46, the SMSC 442 forwards the SMS message to a SMSC 462 that governs the BS 460 of the target mobile device 480, and then sends the SMS message to the mobile device 480 through the BS 460. After receiving the SMS message from the mobile device 420, the mobile device 480 replies to the mobile device 420 with another SMS message including its network information, containing an IP address and a port number of the mobile device 480. After obtaining the network information of the mobile device 480, the mobile device 420 initiates a VoIP conversation by sending a signaling invite request to the mobile device 480 directly through the Internet 45 (through the access points 422 and 482). The mobile device 480 then replies a signaling confirm to the mobile device 420 through the Internet 45 if the VoIP conversation is accepted. At this time, the mobile device 480 will start to ring, meaning that the mobile device 480 is ready to make this VoIP call. While receiving the signaling confirm, the mobile device 420 sends a signaling acknowledgement to the mobile device 480. From now on, the mobile device 420 and 480 can communicate with each other through the Internet 45 and the VoIP call is therefore established. The detail signal transmission process is described in the following FIG. 5.

Figure 5:
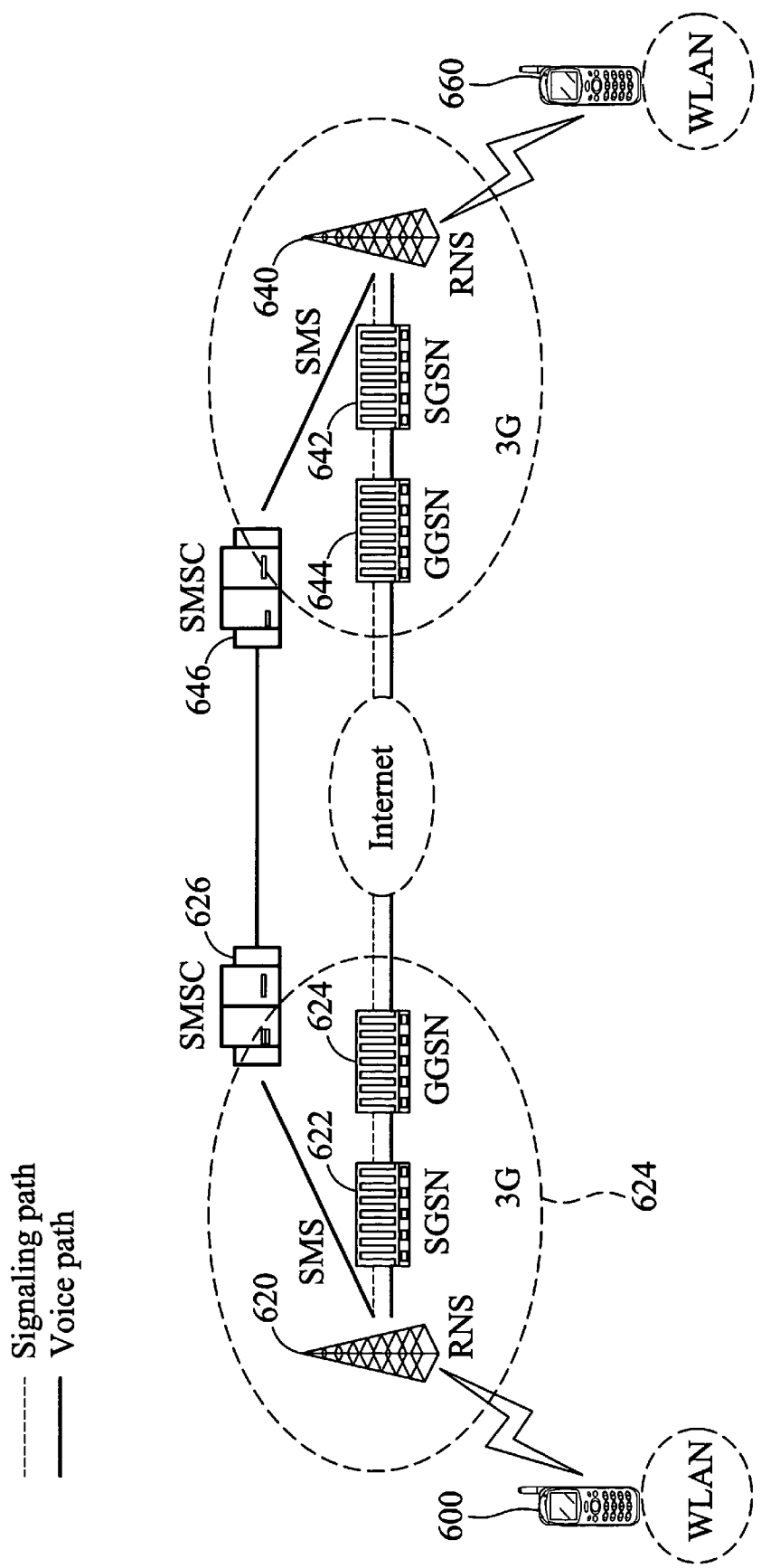
FIG. 5 illustrates an embodiment of a VoIP network established on a 3G network.

FIG. 5 shows an embodiment of VoIP call establishing procedures using SIP. In this embodiment, Mobile 1 first sends a SMS message to Mobile 2 for establishing a VoIP call through a telecommunication system. The telecommunication system helps Mobile 1 find where the Mobile 2 is and send the SMS message to the Mobile 2. The telecommunication system could be a GSM, GPRS, EBGE, 3G system, WCDMA, or any other communication system that supports a SMS service. This SMS message sent by the Mobile 1 is named a query instant message (address_1, port_1), which is transmitted to Mobile 2 through SMSC 1 and SMSC 2. In the present invention, it is assumed that every caller or callee who want to communicate with others by VOIP need to reserve a port number. To avoid interrupt other possible applications, the port number should be chose according to its current system service requirements. Here, the address_1 and port_1 are the IP address and port number of Mobile 1. Mobile 2 replies a response instant message (address_2, port_2) to Mobile 1 when receiving the query instant message (address_1, port_1). Here, the address_2 and port_2 are the IP address and port number of Mobile 2. The instant messages 52 for exchanging IP addresses and port numbers are forwarded by the SMSCs using SMS or MMS. The following signaling 54 exchanged between Mobile 1 and Mobile 2 is delivered using internet packets. Mobile 1 sends a SIP invite request to Mobile 2 through Internet 45 (as shown in FIG. 4) when obtaining the IP address and port number from Mobile 2. The Internet 45 could be provided by any bearer service providers in local area, such as WLANs or LANs at airports or buildings. The IP bearer services may be supported by Asymmetric Digital Subscriber Line (ADSL) or cable services providers. Mobile 2 replies with a SIP ringing message to Mobile 1 and then starts to ring. When the user (callee) of Mobile 2 answers the ringing, Mobile 2 further sends a SIP 200 OK to Mobile 1. Mobile 1 replies with a SIP ACK when receiving the SIP 200 OK from Mobile 2. VoIP conversation is thus established. Since the Internet 45 is generally free to the public, by this invention, users (callers or callees) only are charged for the SMS message transmission service fees. Therefore, users can make VoIP calls to anyone, without additional cost, registration procedures, different system compatibility, or maintenance and security of registration servers.

Instead of using SMS in a telecommunication network, any person skilled in the art should understand that the network information can be exchanged by using emails, IMPS (mobile instant messaging and presence services), MMS (multimedia messaging service), or any instant messages.

An embodiment of establishing a VoIP connection between two users GH_Tu and TY_Lin is described as follows. In this embodiment, it is assumed that GH_Tu sends an address query message to TY_Lin using a SMS message comprising the information "Addr_query, GH_Tu, 09288771556, 172.21.120.60, 1235". Here, the format of the SMS messages is "message type, name, phone number, IP address, port number". TY_Lin replies with an address query response to GH_Tu using a SMS message comprising information of "Addr_res, TY_Lin, 09288771123, 172.21.120.92, 5598". GH_TU thus retrieves the necessary network information (IP address and port number) from the SMS message for establishing a VoIP call to TY_Lin using Internet packets. Compared to the conventional VoIP system, in the present invention, the cost of this VoIP call establishment is low because customers do not need to pay for VoIP service, even if the call duration is up to 10 hours.

In some embodiments, the cost of sending SMS messages for exchanging network information may also be reduced by storing the obtained network information in a database. If a caller wants to recall a callee, the network information about the callee can be directly retrieved from its database with no need to transmit instant messages again. The format of the database may be shown as following:

Item 1: TY_Lin, 09288771123, 172.21.120.92, 5598;
Item 2: TY_Lee, 09288771456, 172.21.120.56, 9778.

The user, for example, GH_Tu, may check the validity of the database and update the database whenever he powers on the mobile phone. While powering on the mobile phone, GH_Tu sends a signaling query comprising his own IP address and port number to each user stored in the database, for example, TY_Lin. If the IP address and port number of TY_Lin are still valid, he will receive the signaling query. After receiving the signaling query, TY_Lin will reply with a signaling response comprising his own IP address and port number to GH_Tu. If GH_Tu does receive the signaling response from TY_Lin, the entry of TY_Lin in the database will be considered valid. If not, the entry of TY_Lin should be deleted from the database. Therefore, by proper maintenance of the database, users can effectively retrieve other's network information. It should be noted that the signaling query and signaling response can also be delivered by Internet packets via WLAN or 3G network, as the Internet packets will be less expensive than the instant message such as SMS messages.

In another embodiments, when the IP address of GH_Tu changes, GH_Tu can send a signaling update message to users stored in the database to inform of the updated network information. An exemplary signaling update message is "Addr_Update, GH_Tu, 09288771556, 172.21.120.55, 9876". Similarly, the signaling update message may be delivered by Internet packets to reduce cost.

Prior to making a VoIP call to a user, for example, TY_Lee, GH_Tu first examines the database for network information of TY_Lee. If an entry of TY_Lee is found, GH_Tu sends a signaling invite request (such as a SIP invite) to TY_Lee according to the IP address and port number obtained from the database. If the network information of TY_Lee is not found in the database, GH_Tu will send a query instant message to acquire the network information of TY_Lee, and send the signaling invite request after obtaining the network information from TY_Lee.

FIG. 6 illustrates an embodiment of a VoIP network established on a 3G network. Mobiles 600 and 660 exchange network information through SMSCs 626 and 646 using SMS messages. The details about how Mobiles 600 and 660 exchange network information through SMSCs 626 and 646 are already described in the above descriptions of FIG. 4 and FIG. 5. In this embodiment, in a 3G network, the mobile 600 initiate a VoIP conversation by sending an invite request to the mobile 660 over the Internet through the GPRS support nodes 622, 624, 642, and 644.

While the invention has been described by way of example and in terms of preferred embodiments, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of Voice over Internet Protocol (VoIP) in a network having a first device and a second device, the first device and the second device respectively having a network information corresponding to an internet based network with a registrar server, at least one proxy server and at least one redirect server, the method of VoIP in the network comprising:

exchanging the network information between the first device and the second device through the network without a prior registration to the registrar server;

sending a signaling invite request through the internet based network from the first device to the second device according to the network information of the second device;

sending a signaling confirm through the internet based network from the second device to the first device if the second device accepts the signaling invite request; and replying with a signaling acknowledgement through the internet based network from the first device to the second device to establish a VoIP connection between the first device and the second device, wherein the signaling invite request, the signaling confirm and the signaling acknowledgement are transmitted without passing through the at least one proxy server and the at least one redirect server.

2. The VoIP method according to claim 1, wherein the network information comprises an IP address and a port number.

3. The VoIP method according to claim 1, wherein the exchanging step further comprises:

sending a query instant message carrying the network information of the first device to the second device; and responding the query instant message with a response instant message carrying the network information of the second device to the first device when the query instant message is received by the second device.

4. The VoIP method according to claim 3, wherein the query instant message and the response instant message respectively comprise a user name, a user phone number, an IP address and a port number.

5. The VoIP method according to claim 1, wherein the network information is exchanged using short message service (SMS), Multimedia Messaging Service (MMS), or Instant Messaging and Presence Services (IMPS) provided by the network.

6. The VoIP method according to claim 1, wherein the network information is exchanged using email service provided by the network.

7. The VoIP method according to claim 1, wherein the VoIP connection is established by sending and receiving Session Initiation Protocol (SIP) packets according to the exchanged network information.

8. The VoIP method according to claim 1, wherein the first device and the second device are dual mode mobile phones that can connect with both the internet base network and the network.

9. The VoIP method according to claim 1, wherein the network is a WLAN or LAN network.

10. The VoIP method according to claim 1, wherein the network is a GSM, GPRS, EDGE, CDMA or WCDMA communication network.

11. The VoIP method according to claim 1, wherein the network information of the second device is stored in at least one database, further comprising:

sending a signaling query through the internet based network to the second device according to the network information of the second device stored in the database; and validating the network information of the second device stored in the database if a signaling response replied from the second device is received.

12. The VoIP method according to claim 11, further comprising:
  deleting the network information of the second device from the database if no signaling response is received in a predetermined time.

13. The VoIP method according to claim 11, wherein the signaling query carries the network information of the first device, and the signaling response carries the network information of the second device.

14. The VoIP method according to claim 11, further comprising sending a signaling update through the internet based network to the second device according to the network information of the second device stored in the database when the network information of the first device is changed, wherein the signaling update carries the updated network information of the first device.

15. The VoIP method according to claim 11, wherein the exchanging step further comprising:
  checking whether the network information of the second device is in the database; and
  if yes, directly taking the network information of the second device in the database as the exchanged network information.

16. A Voice over Internet Protocol (VoIP) system, comprising:
  a first device;
  a second device;
  an internet based network having a registrar server, at least one proxy server and at least one redirect server, wherein the first device and the second device respectively have a network information corresponding to the internet based network; and
  a network for exchanging the network information between the first device and the second device without a prior registration to the registrar server;
  wherein a VoIP connection between the first device and the second device through the internet based network according to the exchanged network information is established by sending a signaling invite request from the first device to the second device through the internet based network, sending a signaling confirm from the second device to the first device when the second device accepts the signaling invite request, and replying with a signaling acknowledgement from the first device to the second device when the first device receives the signaling confirm, and
  wherein the signaling invite request, the signaling confirm and the signaling acknowledgement are transmitted without passing through the at least one proxy server and the at least one redirect server.

17. The VoIP system according to claim 16, wherein the network information comprises an IP address and a port number.

18. The VoIP system according to claim 16, wherein the first device sends a query instant message carrying the network information of the first device to the second device, and the second device replies with a response instant message carrying the network information of the second device to the first device when receiving the query instant message from the first device.

19. The VoIP system according to claim 18, wherein the query instant message and the response instant message respectively comprise a user name, a user phone number, an IP address and a port number.

20. The VoIP system according to claim 16, wherein the network information is exchanged using short message service (SMS), Multimedia Messaging Service (MMS), or Instant Messaging and Presence Services (IMPS) provided by the network.

21. The VoIP system according to claim 16, wherein the network information is exchanged using email service provided by the network.

22. The VoIP system according to claim 16, wherein the VoIP connection is established by sending and receiving Session Initiation Protocol (SIP) packets according to the exchanged network information.

23. The VoIP system according to claim 16, wherein the first device and the second device are dual mode mobile phones that can connect with both the internet base network and the network.

24. The VoIP system according to claim 16, wherein the network is a WLAN or LAN network.

25. The VoIP system according to claim 16, wherein the network is a GSM, GPRS, EDGE, CDMA or WCDMA communication network.

26. The VoIP system according to claim 16, wherein the network further comprises a Short Message Service Center (SMSC) for exchanging the network information using short message service (SMS).

27. The VoIP system according to claim 16, wherein the first and second devices connect to the internet based network through a wireless local area network (WLAN).

28. The VoIP system according to claim 16, further comprises a first Access Point (AP) and a second AP, and the first and second mobile devices connect to the Internet based network via the first AP and the second AP respectively.

29. The VoIP system according to claim 16, further comprises a first base station (BS) and a second BS, and the first and second devices connect to the network via the first BS and the second BS respectively.

30. The VoIP system according to claim 16, wherein the network information of the second device is stored in at least one database, the first device sends a signaling query through the internet based network to the second device according to the network information of the second device stored in the database, and validates the network information of the second device stored in the database if a signaling response replied by the second device is received.

31. The VoIP system according to claim 30, wherein the first device further deletes the network information of the second device from the database if no signaling response is received.

32. The VoIP system according to claim 30, wherein the signaling query carries the network information of the first device, and the signaling response carries the network information of the second device.

33. The VoIP system according to claim 30, wherein the first device sends a signaling update through the internet based network to the second device according to the network information of the second device stored in the database when the network information of the first device is changed, wherein the signaling update carries the updated network information of the first device.

34. The VoIP system according to claim 30, wherein before establishing the VoIP connection, the first device checks whether the network information of the second device is in the database, if yes, the first device directly takes the network information of the second device in the database as the exchanged network information.

* * * * *